(12) United States Patent
Campbell

(10) Patent No.: US 7,475,842 B2
(45) Date of Patent: Jan. 13, 2009

(54) TAPE MEASURE UTILIZING MECHANICAL DECOUPLING OF POWER TAPE EXTENSION FEATURE FOR TAPE RETRACTION

(75) Inventor: David C. Campbell, Bel Air, MD (US)

(73) Assignee: Black & Decker Inc., Towson, MD (US)

( * ) Notice: Subject to any disclaimer, the term of this patent is extended or adjusted under 35 U.S.C. 154(b) by 326 days.

(21) Appl. No.: 11/324,908

(22) Filed: Jan. 4, 2006

(65) Prior Publication Data
US 2007/0152091 A1 Jul. 5, 2007

(51) Int. Cl.
*B65H 75/30* (2006.01)
(52) U.S. Cl. .................... 242/394; 242/379; 242/390.2; 242/390.8; 33/761; 33/767
(58) Field of Classification Search ................. 242/379, 242/390.2, 390.8, 394, 385.4; 33/761, 767
See application file for complete search history.

(56) References Cited

U.S. PATENT DOCUMENTS

| | | | | |
|---|---|---|---|---|
| 4,189,107 A | * | 2/1980 | Quenot et al. ............ | 242/390.1 |
| 4,551,847 A | * | 11/1985 | Caldwell ...................... | 377/24 |
| 5,448,837 A | * | 9/1995 | Han-Teng ..................... | 33/761 |
| 5,471,761 A | * | 12/1995 | Cheng ........................ | 33/761 |
| 5,875,987 A | * | 3/1999 | Pullen ........................ | 242/379 |
| RE37,824 E | | 9/2002 | Pullen | |
| 6,751,883 B2 | | 6/2004 | Liao | |
| 7,284,339 B1 | * | 10/2007 | Campbell et al. ............. | 33/755 |

* cited by examiner

*Primary Examiner*—Sang Kim
(74) *Attorney, Agent, or Firm*—Shook, Hardy & Bacon L.L.P.

(57) ABSTRACT

A power operated tape measure enables extension of a tape via a drive mechanism, as well as retraction of the tape through a mechanical decoupling within the drive mechanism. The tape measure has a housing within which is positioned a spring-biased tape assembly, the drive mechanism and a clutch. The spring-biased tape assembly includes an annular reel onto which is wound a tape having indicia for taking length measurements. The drive mechanism includes a driving gear and a driven gear, and is adapted to engage with a bottom surface of the tape to extend the tape out of the housing. The clutch is adapted to displace the driven gear out of engagement with the driving gear and thereby decouple the driving and braking force provided by the drive mechanism from acting upon the bottom surface of the tape to permit the spring-biasing of the tape assembly to retract the tape into the housing.

19 Claims, 3 Drawing Sheets

TAPE MEASURE UTILIZING MECHANICAL DECOUPLING OF POWER TAPE EXTENSION FEATURE FOR TAPE RETRACTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to retractable tape measurement devices. More particularly, the present invention is directed to a tape measure employing power operated tape extension that may be disengaged for retraction of the tape back into a housing of the tape measure.

Retractable tape measurement devices, or "tape measures", are well known. These tape measures generally have a housing formed by opposed sidewalls. An aperture in the housing allows an elongated tape or "blade" having measurement indicia thereon to extend out of and retract into the housing as needed. The tape is typically wound on a reel in a coil rolled manner with the reel being rotatably mounted within the housing. A first end of the tape may be attached to the reel and second free end of the tape typically has a stop or hook to prevent the second end of the tape from entering the housing. A retracting means, such as a recoil spring, is coupled with the reel to bias the reel in a direction to wind the tape onto the reel and retract the tape into the housing. A user can pull on the hook against the force of the retracting means to extend the tape out of the housing for making a measurement. A brake lever or the like may be provided so that the tape may be frictionally held at a selected position of extension while a measurement is made, and then released for retraction.

As an improvement to the operation of a conventional tape measure, power operated tape measures have been devised. The most popular design for a power operated tape measure is to include a motor that employs power operated tape extension out of the housing. This is accomplished through a gear and roller system coupled with the motor and engaging with a bottom or outwardly exposed surface of the tape as it is wound on the reel. The motor may then drive the unwinding of the tape from the reel through the gear/roller system so that the tape extends out of the housing a selected amount. Although a tape measure configured with power operated tape retraction may be implemented, such a design is often undesirable due to the complexity of employing a motor that rotates under electrical power in opposed directions to accomplish tape extension and retraction. A typical power operated tape measure, therefore, relies on a conventional recoil spring for tape retraction while utilizing a motor means for tape extension.

One design issue with tape measures having only power operated tape extension is that the gearing/rollers coupled with the motor must be disengaged from the tape surface in order for the recoil spring to accomplish quick tape retraction, i.e., without having to overcome the braking force provided by the resistance of the motor to being rotated backwardly. Various mechanisms have been employed to move a drive roller out of engagement with the tape, such as by the switch actuator and rod arrangement disclosed in U.S. Pat. No. RE37,824. However, such an arrangement is disadvantageous because as the diameter of the coiled tape becomes smaller (due to extension of a portion of the tape out of the housing), the tape driving roller must move inwardly towards the centerpoint of the reel to maintain contact with the remaining tape. This motion of the driving roller displaces the rod and actuator coupled therewith with respect to the housing, which is undesirable because the actuator does not remain in a consistent position on the housing for initiating tape retraction.

BRIEF SUMMARY OF THE INVENTION

A tape measure employing power operated tape extension is provided. The tape measure is configured so that a power operated extension mechanism may be decoupled from engagement with an elongated tape to permit retraction of the tape back into a tape measure housing under the influence of a retraction feature. Decoupling of the power operated extension mechanism may be achieved through a clutch mechanism.

In one aspect, the tape measure has a housing within which is positioned a spring-biased tape assembly. The tape assembly includes an annular reel with a tape wound thereon, the tape presenting a bottom surface. Extension of the tape out of the housing is accomplished by a drive mechanism that engages with the bottom surface of the tape and an associated power source electrically coupled with the drive mechanism. The drive mechanism includes a driving gear and a driven gear that interface with one another. A clutch mechanism is designed to selectively displace the driven gear away from, and out of engagement with, the driving gear to decouple the driving force provided by the drive mechanism from acting upon the bottom surface of the tape. The tape may then freely retract into the housing and wind back onto the reel under the influence of the spring-biasing on the tape assembly.

In another aspect, the tape measure includes a tape extension switch and a tape retraction switch both electrically coupled between the drive mechanism and the power source to control the flow of electrical power from the power source to the drive mechanism. User initiated movement of the tape extension switch causes electrical power to flow to the drive mechanism for tape extension. The tape retraction switch, which is coupled with the clutch, is moved to an open position upon the user moving the clutch to effect driven gear displacement. In the open position, the tape retraction switch interrupts electrical power flow to the drive mechanism while the clutch operates to decouple the drive mechanism from engagement with the bottom surface of the tape.

The clutch, in another aspect, includes a button extending through an aperture in the housing, the button being axially aligned with a transmission shaft onto which the driven gear is mounted. A spring seat and a compression spring also form a part of the clutch. The spring seat is axially aligned with the transmission shaft and positioned adjacent to one end of the transmission shaft opposite of another end that is contacted by the button. The compression spring is adapted to fit within the spring seat to contact the driven gear and bias the transmission shaft towards the button. Depression of the button axially displaces the transmission shaft and the driven gear fixedly positioned therewith to move the driven gear out of engagement with the driving gear.

As such, the tape measure of the present invention provides a consistently positioned drive mechanism disengagement feature in the form of a clutch. Therefore, users can easily and consistently initiate drive mechanism disengagement and retraction of the tape back into the housing.

BRIEF DESCRIPTION OF THE SEVERAL VIEWS OF THE DRAWING

In the accompanying drawings which form a part of the specification and are to be read in conjunction therewith and in which like reference numerals are used to indicate like elements in the various views.

DETAILED DESCRIPTION OF THE INVENTION

Figure 1:
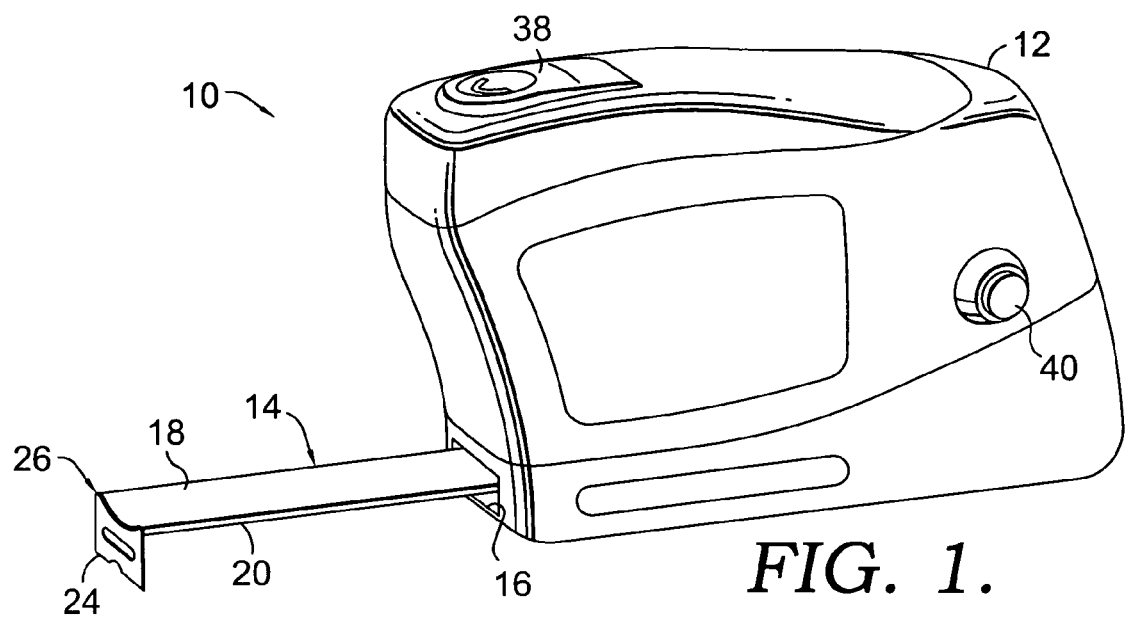
FIG. 1 is a perspective view of an exemplary housing configuration for a tape measure of the present invention.

Referring now in more detail to the drawings, and initially to FIG. 1, there is illustrated an embodiment of a tape measure of the present invention designated by the reference numeral 10. The tape measure 10 has a housing shell, or housing 12, enclosing various components that control operation of the tape measure 10, as will be more fully explained below with reference to FIGS. 2-6. An elongated tape 14 having measurement indicia thereon is designed to travel through an opening 16 in the housing 12 to extend out of, and retract into, the housing 12 as needed for making a measurement of the length of an object adjacent to the tape 14. Although the tape 14 may take different forms, one conventional tape configuration suitable for integration into the tape measure 10 is for the tape 14 to take the shape of a thin blade having a top surface 18 upon which the measurement indicia is located and a bottom surface 20. A hook 24 extends downwardly from a free end 26 of the tape 14 to prevent retraction of the free end 26 into the housing 12.

Figure 2:
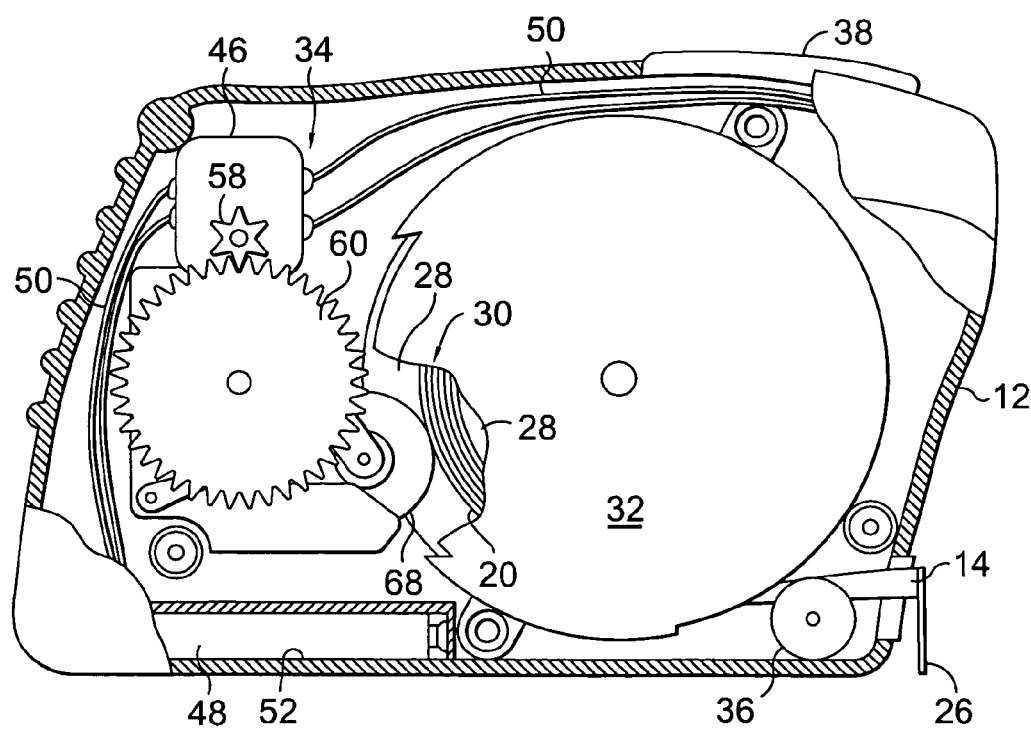
FIG. 2 is a side elevational view of the tape measure, partially in section, and with a portion of the housing removed to show various internal components thereof.

With reference to FIG. 2, the elongated tape 14, a reel 28 onto which the tape is wound, and a biasing means (not shown) to bring about rotation of the reel 28 form together a spring-biased tape assembly 30. The reel 28 is rotatably mounted within a cartridge 32 fixedly positioned within the housing 12, and the biasing means of the conventional type causes the reel 28 to rotate within the cartridge 32 in a direction so as to wind the tape 14 onto the reel 28. The tape 14 is connected with the reel 28 on an end thereof opposite of the free end 26 such that the rotation of the reel 28 by the biasing means effects such tape winding. A drive mechanism 34 is positioned within the housing 12 to contact the tape bottom surface 20 to impart a force thereon sufficient to overcome the biasing on the reel 28 in the opposing direction to rotate the reel 28 and thereby drive the tape 14 out of the housing 12. A support roller 36 aids in guiding the tape 14 through the housing opening 16

Figure 3:
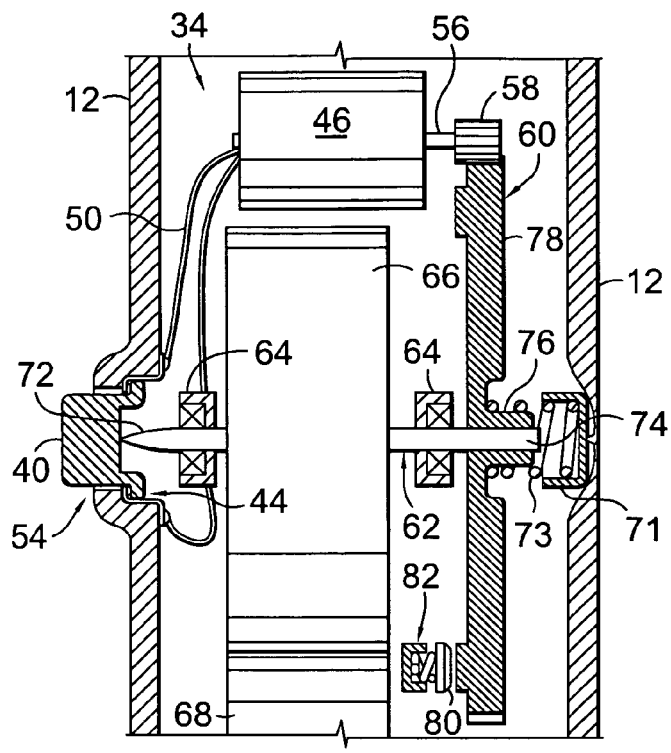
FIG. 3 is a fragmentary rear elevational view, partially in section, showing the clutch in a position where the drive mechanism retains coupling with the tape.
Figure 4:
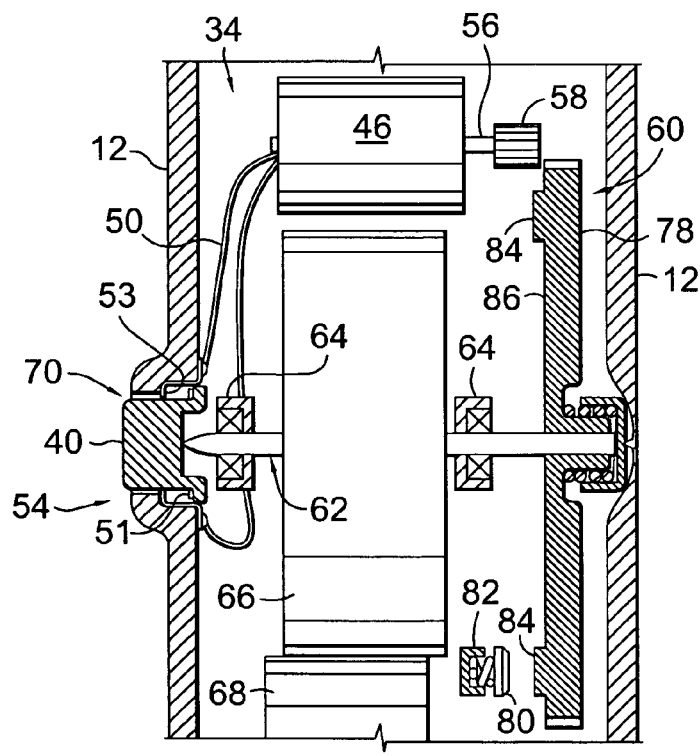
FIG. 4 is a fragmentary rear elevational view, partially in section, showing the clutch in a position to effect decoupling of the drive mechanism from the tape.
Figure 5:
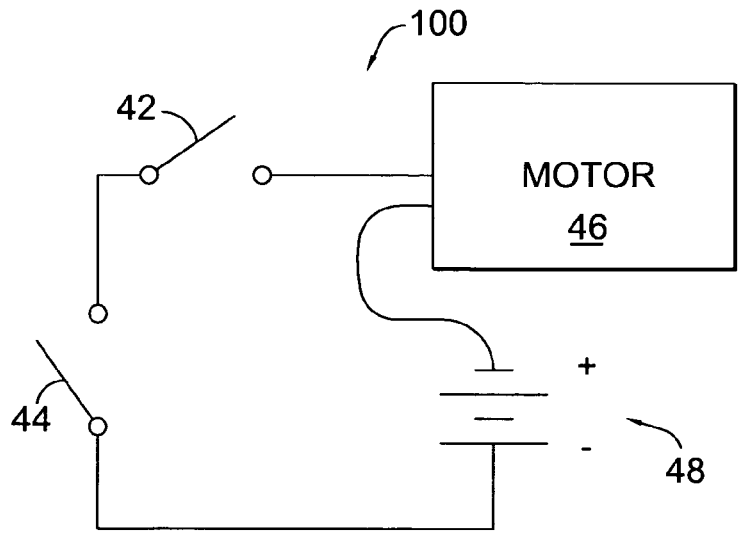
FIG. 5 is a schematic diagram of an electrical circuit regulating operation of the tape measure.

A user may control extension of the tape 14 through a tape extension button 38 located on the housing 12 and, likewise, control retraction of the tape 14 through a tape retraction button 40 located on the housing 12, both of which are shown in FIG. 1. One suitable electrical circuit 100 for controlling the power operated tape extension features of the tape measure 10 is schematically illustrated in FIG. 5. The electrical circuit 100 includes an extension switch 42 connected with the tape extension button 38, and a retraction switch 44 connected with the tape retraction button 40. A motor 46 of the drive mechanism 34 and a power source 48 (e.g., one or more batteries) are also coupled to the circuit so that opening and closing of the extension switch 42 and the retraction switch 44 controls the electrical power flow to the motor 46. In other words, the switches 42 and 44 control electrical decoupling of the drive mechanism 34 from the power source 48. As seen in FIGS. 2-4, various wiring 50 electrically connects the switches 42 and 44, and the power source 48, to the motor 46 to form the circuit 100. Preferably, the power source 48 takes the form of one or more batteries housed within a battery receiving chamber 52 located within the housing 12.

To complete the circuit 100, the tape extension button 38 is depressed downwardly into the housing 12 and the tape retraction button 40 is not depressed, placing both the extension switch 42 and the retraction switch 44 in the closed position. The user can depress the tape extension button 38 for a desired amount of time to selectively extend as much tape out of the housing 12 as is needed for a measurement. On the other hand, if either the tape extension button 38 is not being depressed, or, as seen in FIG. 4, the tape retraction button 40 is being depressed laterally inwardly on the housing 12, at least one of the extension switch 42 and the retraction switch 44 is in the open position, thereby preventing electrical power flow from the power source 48 to the motor 46. The tape retraction button 40 has a conductive contact 51 formed thereon, which engages with leads 53 of the wiring 50 to close the retraction switch 44. The tape retraction button 40 also serves as an activator for a clutch mechanism 54 to accomplish mechanical decoupling of the motor 46 of the drive mechanism 34 from other components of the drive mechanism 34 that effectuate extension of the tape 14 out of the housing 12. The clutch 54 will be explained in further detail below.

With reference again to FIGS. 2-4, the motor 46 is rigidly mounted to the housing 12 and has a rotatable output shaft 56 onto which a pinion 58 is affixed. The pinion 58 engages with a power transmission gear 60 affixed to a transmission shaft 62 that is rotatably and axially slidably mounted within the housing 12. In this arrangement, the pinion 58 serves as a driving gear and the power transmission gear 60 serves as the driven gear to transfer the torque on the output shaft 56 to the transmission shaft 62. The transmission shaft 62 extends through a set of ball bearings 64 to enable rotation and axial sliding of the shaft 62, wherein the axial motion allows the clutch 54 to accomplish mechanical decoupling within the drive mechanism 34 as discussed in more detail below. Both the pinion 58 and the power transmission gear 60 are preferably spur gears, but may alternatively be rollers frictionally engaging with one another.

Figure 6:
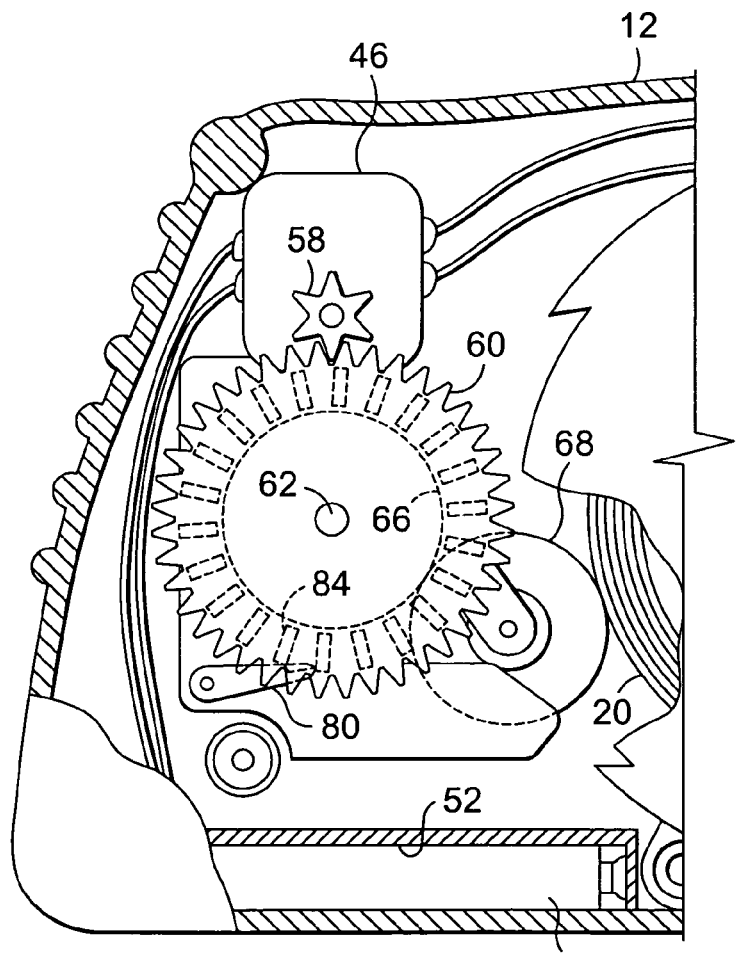
FIG. 6 is an enlarged fragmentary side elevational view, partially in section, showing in more detail the interfacing of various internal components of the tape measure.

Also affixed on the transmission shaft 62 is a first drive roller 66 spaced laterally from the power transmission gear 60 and configured to frictionally engage with a second drive roller 68 that is also rotatably mounted within the housing. As seen in FIG. 6, the second drive roller 68 is positioned to contact the tape bottom surface 20 and transfer the torque of the first drive roller 66 to the tape 14 for driving tape extension. Therefore, the driving mechanism 34 extends from the motor 46 and the output shaft 56 thereof to the second drive roller 68. The second drive roller 68 is movably positioned within the housing 12 and is biased upwardly into contact with the first drive roller 66 and the bottom surface 20 of the tape 14 while it is on the reel 28. As the tape 14 is unwound from the reel 28 during the extension phase, the circumference of the tape on the reel 28 decreases and the second drive roller 68 moves upwardly to keep the driving mechanism 34 in contact with the tape. As the tape 14 is wound back upon the reel 28 during the retraction phase, the circumference of the tape on the reel 28 increases and the second drive roller 68 moves downwardly, thereby permitting the tape 14 to continue to wind up on the reel 28 but still keeping the second drive roller 68 in contact with both the bottom surface 20 of the tape 14 and the first drive roller.

The tape retraction button 40 of the clutch 54 extends through an aperture 70 in the housing 12 and is axially aligned with the transmission shaft 62, as seen in FIGS. 3 and 4. The tape retraction button 40 is also proximally located with respect to a first end 72 of the transmission shaft 62. Depression of the tape retraction button 40 causes the button 40 to contact the first end 72 of the transmission shaft 62 and axially displace the shaft 62. Through this axial displacement, the power transmission gear 60 affixed to the transmission shaft 62 is moved from a first position in engagement with the pinion 58 (as shown in FIG. 3) to a second position out of engagement with the pinion 58 (as shown in FIG. 4). This motion accomplishes mechanical decoupling within the driving mechanism 34 so that the motor 46 can no longer drive tape extension. Additionally, depression of the tape retraction button 40 opens the retraction switch 44 by separating the conductive contact 51 from the wiring leads 53. Therefore, if the user depresses the tape extension button 38 while the power transmission gear 60 and the pinion 58 are out of engagement, the motor 46 will not receive electrical power and spin freely.

To bring the power transmission gear 60 and the pinion 58 back into engagement upon releasing the tape retraction button 40, a spring seat 71 and a compression spring 73 are also provided in the clutch mechanism 54. The spring seat 71 is axially aligned with the transmission shaft 62 and positioned adjacent to a second end 74 of the shaft 62 against the housing 12. The compression spring 73 is sized to fit within the spring seat 71 and surround a collar 76 of the power transmission gear 60 to press against a first lateral side 78 of the gear 60. The force provided by the compression spring 73 urges the power transmission gear 60 and the transmission shaft 62 to which the gear 60 is attached axially towards the tape retraction button 40 to move the button 40 back to the position shown in FIG. 3. In this motion, the power transmission gear 60 and the pinion 58 reengage with one another.

With further reference to FIGS. 3, 4 and 6, a pawl 80 may be provided that engages with the power transmission gear 60 to inhibit "creeping" of the tape 14 back into the housing 12 from a position of extension. Creeping, or slow retraction, may occur over time even if the tape retraction button 40 is not depressed. This is due to the spring bias of the tape assembly 30 tending to urge retraction of the tape 14 into the housing with a force sufficient to overcome the natural braking force provided by frictional resistance throughout the driving mechanism 34 and the electrical breaking provided by the motor 46 resistance to being rotated in a backward direction when not activated. The pawl 80 is pivotally mounted within the housing and may be urged by a rotational biasing means (not shown) upwardly towards the power transmission gear 60 and by a lateral biasing means 82 (e.g., compression spring and spring seat) laterally towards the gear 60. This urging causes the pawl 80 to pivotably engage with a plurality of protrusions 84 formed on and disposed radially around a second lateral side 86 of the power transmission gear 60 when the gear 60 is in engagement with the pawl 80, as seen in FIGS. 3 and 6. As such, the pawl 80 prevents the power transmission gear 60 from rotating in a direction that would allow the first and second drive rollers 66 and 68 to move under the influence of the retracting tape 14. At the same time, the pawl 80 does not prohibit rotation of the power transmission gear 60 in a direction that drives extension of the tape 14 because the pawl 80 slides over each protrusion 84 without binding itself between two adjacent protrusions 84. When the tape retraction button 40 is depressed to move the power transmission gear 60 from the first position to the second position, the pawl 80 becomes disengaged from the protrusions 84 and will not prevent the backward rotation of the drive rollers 66, thereby permitting the spring bias of the tape assembly 30 to retract the tape 14 back into the housing 12.

From the foregoing it will be seen that the tape measure 10 of the present invention provides a convenient and reliable way to provide power operated tape extension as well as consistent tape retraction. Various modifications may be made to the tape measure 10 without departing from its scope, and are all contemplated to be within the teachings of the present invention. For example, it is within the scope of one of ordinary skill in the art to modify the size or dimensions of the gears and the drive rollers.

It will be understood that certain features and subcombinations are of utility and may be employed without reference to other features and subcombinations. This is contemplated by and is within the scope of the present invention. It is also to be understood that all matter herein set forth or shown in the accompanying drawings is to be illustrative of applications of the principles of the invention, and not in a limiting sense.

What is claimed is:

1. A tape measure employing selectively engageable power operated tape extension, the tape measure comprising:
    a housing having a battery receiving chamber;
    a spring-biased tape assembly positioned within the housing and including:
        an annular reel; and
        a tape wound onto the annular reel, the tape having a bottom surface;
    a motor mounted within the housing and having a rotatable output shaft;
    a driving gear fixedly positioned on the output shaft;
    a transmission shaft rotatably mounted within the housing;
    a power transmission gear fixedly positioned on the transmission shaft for selective engagement with the driving gear to receive a torque from the output shaft;
    a drive mechanism, including a drive roller in contact with the bottom surface of the tape, for transmitting a torque from the transmission shaft to the tape to extend the tape out of the housing;
    an electrical circuit connecting the motor with the battery receiving chamber to selectively supply the motor with electrical power from at least one battery disposed within the receiving chamber;
    a tape extension switch coupled with the housing and electrically coupled with the electrical circuit, the tape extension switch being selectively moveable to open and close the electrical circuit for controlling the flow of electrical power from the at least one battery to the motor; and
    a clutch mechanism mounted on the housing for selectively axially displacing the transmission shaft to move the power transmission gear from a first position of engagement with the driving gear to a second position of disengagement from the driving gear to permit the spring-biasing of the tape assembly to retract the tape into the housing.

2. The tape measure of claim 1, wherein the clutch mechanism includes a tape retraction switch electrically coupled with the electrical circuit, whereby axial displacement of the transmission shaft and corresponding movement of the power transmission gear from the first position to the second position by the clutch mechanism opens the electrical circuit to prevent flow of electrical power from the at least one battery to the motor.

3. The tape measure of claim 1, wherein the drive roller is a second drive roller, wherein the drive mechanism further includes:
   a first drive roller fixedly positioned on the transmission shaft; and
   wherein the second drive roller is moveably and rotatably mounted within the housing and positioned for engagement with the first drive roller and the bottom surface of the tape.

4. The tape measure of claim 1, wherein the clutch mechanism includes:
   a button extending through an aperture in the housing and axially aligned with the transmission shaft, the button adapted to contact a first end of the transmission shaft upon depression of the button to axially displace the transmission shaft and power transmission gear fixedly positioned therewith;
   a spring seat positioned within the housing and axially aligned with the transmission shaft, the spring seat positioned adjacent to a second end of the transmission shaft; and
   a compression spring adapted to fit within the spring seat and contact the power transmission gear to bias the transmission shaft affixed with the transmission gear towards the button.

5. The tape measure of claim 1, further comprising a pawl pivotably mounted within the housing, and wherein the power transmission gear has opposed lateral sides with at least one of the lateral sides having a plurality of protrusions formed thereon and disposed radially therearound, the pawl adapted to pivotably engage with the protrusions and prevent rotation of the power transmission gear in a direction corresponding with retraction of the tape into the housing.

6. The tape measure of claim 5, wherein the pawl disengages with the protrusions as the clutch mechanism moves the power transmission gear from the first position to the second position.

7. A power operated tape measure comprising:
   a housing;
   a spring-biased tape assembly positioned within the housing and including:
      an annular reel; and
      a tape wound onto the annular reel, the tape having a bottom surface;
   a drive mechanism mounted within the housing and being engageable with the bottom surface of the tape to extend the tape out of the housing, the drive mechanism selectively generating a driving force transferable from a driving gear of the drive mechanism to a driven gear of the drive mechanism;
   a power source electrically coupled with the drive mechanism for supplying electrical power thereto; and
   a clutch mechanism adapted to displace the driven gear out of engagement with the driving gear and thereby decouple the driving force provided by the drive mechanism from acting upon the bottom surface of the tape, thereby permitting the spring-biasing of the tape assembly to retract the tape into the housing.

8. The tape measure of claim 7, wherein the drive mechanism further includes a transmission shaft onto which the driven gear is fixedly positioned, the clutch mechanism comprising:
   a button extending through an aperture in the housing and axially aligned with the transmission shaft, the button adapted to contact a first end of the transmission shaft upon depression of the button to axially displace the transmission shaft and driven gear fixedly positioned thereon;
   a spring seat positioned within the housing and axially aligned with the transmission shaft, the spring seat positioned adjacent to a second end of the transmission shaft; and
   a compression spring adapted to fit within the spring seat and contact the driven gear to bias the transmission shaft affixed with the driven gear towards the button.

9. The tape measure of claim 7, further comprising:
   a tape extension switch mounted couple with the housing and electrically coupled with the drive mechanism and the power source, the tape extension switch being selectively moveable to control the flow of electrical power from the power source to the drive mechanism; and
   a tape retraction switch coupled with the clutch mechanism and electrically coupled to the drive mechanism and the power source, whereby engagement of the clutch to displace the driven gear out of engagement with the driving gear causes the tape retraction switch to move to a position interrupting the flow of electrical power from the power source to the drive mechanism.

10. The tape measure of claim 7, wherein the drive mechanism includes:
    a motor;
    a rotatable output shaft extending from the motor and onto which the driving gear is fixedly positioned;
    a transmission shaft rotatably mounted within the housing and onto which the driven gear is fixedly positioned; and
    at least one roller adapted to transmit a torque from the transmission shaft to the bottom surface of the tape.

11. The tape measure of claim 10, wherein the at least one roller includes a first drive roller fixedly positioned on the transmission shaft, and wherein the tape measure further includes a second drive roller rotatably and movably mounted within the housing and positioned for engagement with the first drive roller and the bottom surface of the tape.

12. The tape measure of claim 7, further comprising a pawl pivotably mounted within the housing, the pawl adapted to pivotably engage with the driven gear to prevent rotation of the driven gear in a direction corresponding with retraction of the tape into the housing.

13. The tape measure of claim 12, wherein the pawl disengages with the driven gear as the clutch displaces the driven gear out of engagement with the driving gear.

14. A power operated tape measure comprising:
    a housing;
    a reel rotatably mounted within the housing;
    a recoil spring coupled with the reel and the housing and biased to rotate the reel in a rewind direction;
    a tape wound onto the annular reel, the tape having a bottom surface;
    a drive mechanism mounted within the housing and being engageable with the bottom surface of the tape to provide a driving force to extend the tape out of the housing, the drive mechanism including:
       a motor having a rotatable output shaft extending therefrom;
       a driving gear fixedly positioned on the output shaft;

a transmission shaft rotatably mounted within the housing;

a driven gear fixedly positioned on the transmission shaft for engagement with the driving gear; and at least one roller adapted to transmit a torque from the transmission shaft to the bottom surface of the tape;

a power source electrically coupled with the drive mechanism for supplying electrical power thereto; and a clutch mechanism adapted to selectively move the driven gear out of engagement with the driving gear, the clutch including:

a button extending through an aperture in the housing and axially aligned with the transmission shaft, the button adapted to contact a first end of the transmission shaft upon depression of the button to axially displace the transmission shaft and driven gear fixedly positioned therewith;

a spring seat positioned within the housing and axially aligned with the transmission shaft, the spring seat positioned adjacent to a second end of the transmission shaft; and a compression spring adapted to fit within the spring seat and contact the driven gear to bias the transmission shaft affixed with the driven gear towards the button;

wherein axial displacement of the transmission shaft ultimately moves the driven gear out of engagement with the driving gear to decouple the driving force provided by the drive mechanism from acting upon the bottom surface of the tape and thereby permit the recoil spring to rotate the reel in the rewind direction to retract the tape into the housing.

15. The tape measure of claim 14, further comprising:

a tape extension switch couple with the housing and electrically coupled with the drive mechanism and the power source, the tape extension switch being selectively moveable to control the flow of electrical power from the power source to the motor; and a tape retraction switch coupled with the button of the clutch mechanism and electrically coupled with the drive mechanism and the power source, whereby depression of the button causes the tape retraction switch to move to a position interrupting the flow of electrical power from the power source to the motor.

16. A power operated tape measure comprising:

a housing;

a reel rotatably mounted within the housing;

a recoil spring coupled with the housing and the reel and biased to rotate the reel in a rewind direction;

a tape at least partially wound upon the reel;

a drive mechanism coupled with the tape, wherein activation of the drive mechanism causes extension of the tape from the housing and rotation of the reel in an extension direction, and wherein the drive mechanism prevents rotation of the reel in the rewind direction when the drive mechanism is not activated and the drive mechanism is coupled with the tape; and a clutch mechanism selectively operable to uncouple a first portion of the drive mechanism from a second portion of the drive mechanism, thereby permitting the recoil spring to rotate the reel in the rewind direction to retract the tape into the housing.

17. The power operated tape measure of claim 16, wherein the second portion of the drive mechanism includes a drive wheel engaged with a bottom surface of the tape and wherein drive wheel remains engaged with the bottom surface of the tape when the recoil spring rotates the reel in the rewind direction.

18. The power operated tape measure of claim 16, wherein the clutch mechanism is selectively operable to laterally move a component of the drive mechanism out of engagement with another component of the drive mechanism.

19. The power operated tape measure of claim 16, wherein the drive mechanism includes a plurality of gears and wherein the clutch mechanism is selectively operable to move one of the gears in and out of engagement with another gear.

\* \* \* \* \*